Aug. 18, 1925.
1,550,624
J. B. LYONS
SHOCK ABSORBER
Filed June 25, 1924
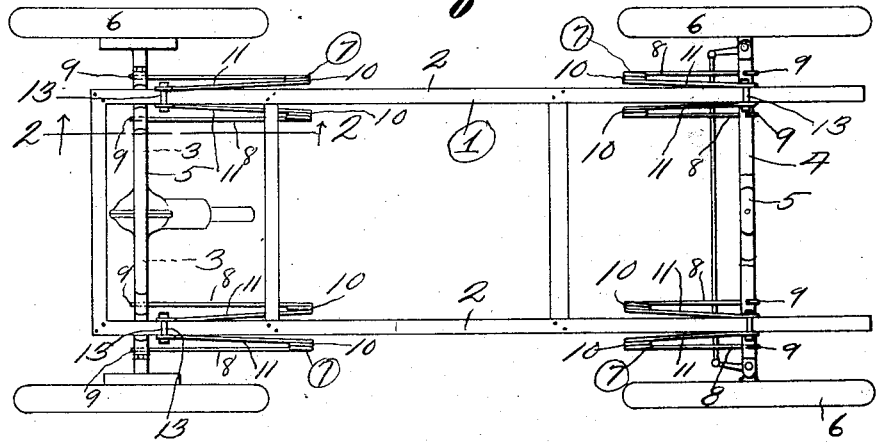
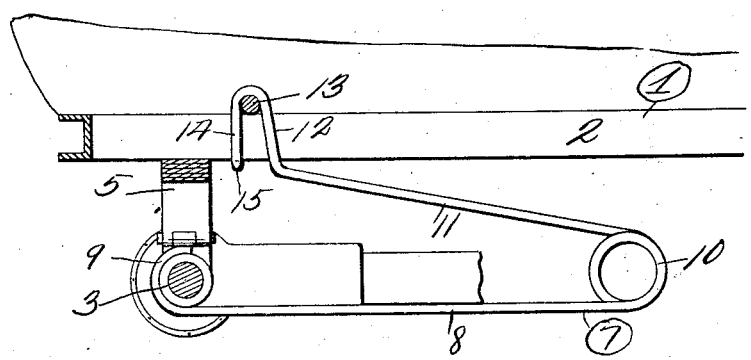
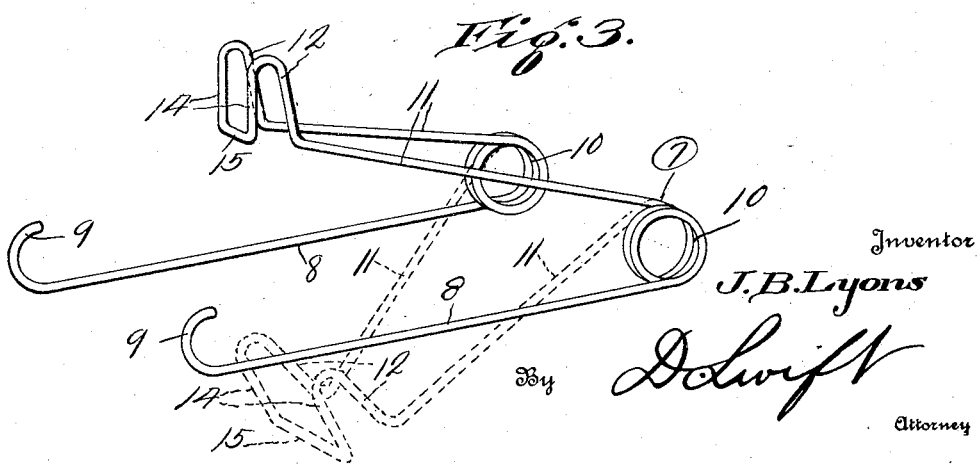
Inventor
J. B. Lyons
By D. Swift
Attorney Patented Aug. 18, 1925.

1,550,624

UNITED STATES PATENT OFFICE.

JOHN BICE LYONS, OF NORPHLET, ARKANSAS.

SHOCK ABSORBER.

Application filed June 25, 1924. Serial No. 722,300.

*To all whom it may concern:*

Be it known that I, JOHN B. LYONS, a citizen of the United States, residing at Norphlet, in the county of Union, State of Arkansas, have invented a new and useful Shock Absorber; and I do hereby declare the following to be a full, clear, and exact description of the invention, such as will enable others skilled in the art to which it appertains to make and use the same.

The invention relates to shock absorbers for automobiles, and has for its object to provide a device of this character which may be easily and quickly applied to a conventional form of automobile without modifying the construction thereof, and cooperating with the rear side of the axles of the automobile and the side rails thereof, whereby when the wheels of an automobile pass over an object the spring will exert a lifting action on the axles and the wheels, thereby obviating jolting or sudden shocks. Also functioning in the above manner when any of the wheels drop into a hole, at which time the springs on the opposite side holds the car bed or frame down to the extent whereby rocking is substantially eliminated, thereby relieving the strain on the main springs of the automobile.

A further object is to provide a shock absorber for automobiles, said absorber comprising substantially horizontally disposed arms engaging the under side of the axle of the automobile, said arms extending away from the axle and terminating in coils, which coils terminate in upwardly inclined arms having upwardly angled portions at opposite sides of the side rail of the automobile frame, and which angled arms are connected together by a U-shaped member which arches the underside of the rail. Also to provide a bolt engaging the upper side of the rail and extending through the loops formed by the angularly disposed arms and the arms of the U-shaped member, thereby rigidly securing the device to the rail.

A further object is to tension the spring coils whereby the upper and lower arms of the device will be normally forced towards each other, thereby exerting a lifting action on the axle.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a top plan view of a conventional form of automobile frame and running gear showing the shock absorber applied thereto.

Figure 2 is a detail sectional view taken on line 2—2 of Figure 1.

Figure 3 is a perspective view of one of the shock absorber springs, showing in dotted lines the positions of the arms in relation to each other before being placed in position.

Referring to the drawing, the numeral 1 designates a conventional form of automobile frame, and 2 the side bars thereof. Disposed beneath the frame 1 adjacent the rear and forward ends are axles 3 and 4, which are of conventional construction, and which support the frame 1 by means of conventional forms of springs 5 in the usual manner. It has been found that automobile springs, especially in cheap automobiles, have not sufficient flexibility for taking up shocks when the wheels 6 are going over obstructions, or into holes into a roadway, consequently the springs soon become fractured and easily broken especially on the rebound action thereof. To obviate this difficulty and to provide means for exerting a lifting action on the axles, thereby reducing the shock to a minimum, the springs 7 are provided. Springs 7 are disposed at opposite sides of the frame 1 at its forward and rear end and cooperate with the axles 3 and 4 in a similar manner for exerting an upward spring action thereon against the action of the vehicle springs 5. All of the springs 7 are of the same construction and function in the same manner, therefore only one of the springs is described in detail and the same numerals apply to all of said springs 7.

Each spring 7 comprises substantially horizontally disposed arms 8, which arms extend towards the axle 3, and engage the under side of the axle and is provided with hooks 9, which extend around the rear side of the axle. The outer ends of the arms 8 terminate in coils 10, which may be formed with as many convolutions desired according to the tension desired to be exerted by the device. Coils 10 terminate in upwardly inclined arms 11, which arms converge towards each other and terminate in inverted U-shaped members 12, which are disposed on opposite sides of the bar 2 of the rail, and receive a transversely disposed bolts 13, which engages the upper side of the rail 2 for anchoring the arms 11 to the rail. The downwardly extending arms 14 of the U-shaped members 12 are connected together by the integral horizontal bar 15, which bar closely engages the underside of the rail 2 for rigidly anchoring the arms 11 to the rail and preventing downward movement of the ends of the arms 11 and 8, which are connected together by the coils 10. It will also be seen that the rigid connection to the rail 2 will prevent movement of the device towards the axle 3, in a manner whereby the hooks 9 carried by the arms 8 will come out of cooperate engagement with the axle 3, and the hooks will in turn prevent any movement of the device away from the axle.

Referring to Figure 3 it will be seen that when the device is not in use, the arms 11 and the rail engaging parts therein are in the dotted line position shown in said figure, therefore it will be seen that when the arms 11 are moved to the full line position shown in Figures 2 and 3, the coils 10 will be tensioned, consequently when the device is in position on an automobile, a lifting action will be imparted on the axle 3, consequently the flexing action of the spring 5 will be materially assisted especially when going over a rough road where obstruction are engaged by the wheels of the automobile, or the wheels move into depressions in the roadway. It will be seen that when one of wheels moves into a depression or hole in the roadway, the springs 7 at the opposite side of the automobile will have a tendency to pull the frame 1 downwardly at said side of the automobile, thereby obviating or reducing to a minimum the tilting or rocking movement of the frame 1. It will also be seen that the springs 7 will have a tendency to lift the wheels out of holes in the road, and reduce the shock upon bound and rebound to a minimum.

From the above it will be seen that spring shock absorbing devices are provided for an automobile, which devices are formed from a single piece of material, and the devices may be easily and quickly applied to an automobile without varying or modifying the construction thereof.

The invention having been set forth what is claimed as new and useful is:—

The combination with a vehicle axle, the side rail of a frame disposed above the axle, spring means connecting the axle and frame, of a shock absorbing device connecting the rail and the axle, said device comprising tensioned coils, arms carried by said coils, the ends of said arms being hooked under and over the axle, arms carried by the coils and inclining upwardly to positions at opposite sides of the rail and below the rail, inverted U-shaped members carried by said last named arms and disposed at opposite sides of the rail, a securing bolt extending transversely through the U-shaped members and engaging the upper side of the rail, and a member connecting arms of the U-shaped members and engaging the underside of the rail; said first named arms and said last named arms being forced toward each other by means of the coils.

In testimony whereof I have signed my name to this specification.

JOHN BICE LYONS.